May 15, 1928. 1,670,127

C. W. STANCLIFFE

SECTIONAL HEAT INTERCHANGER

Original Filed Aug. 30, 1923  2 Sheets-Sheet 1

INVENTOR
Cecil W. Stancliffe
by Wright, Brown, Quinby & May
att'ys

May 15, 1928. 1,670,127

C. W. STANCLIFFE

SECTIONAL HEAT INTERCHANGER

Original Filed Aug. 30, 1923 2 Sheets-Sheet 2

INVENTOR
Cecil W. Stancliffe by Wright, Brown, Quinby & May
Att'ys

Patented May 15, 1928.

1,670,127

UNITED STATES PATENT OFFICE.

CECIL W. STANCLIFFE, OF LONDON, ENGLAND, ASSIGNOR TO STANCLIFFE ENGINEERING CORPORATION, OF NEW YORK, N. Y., A CORPORATION OF NEW YORK.

SECTIONAL HEAT INTERCHANGER.

Application filed August 30, 1923, Serial No. 660,139. Renewed April 27, 1927.

This invention relates to heat interchangers or heating elements of the type in which two or more sets of passages transverse to one another are formed in a solid mass of metal, or other suitable heat-conducting material, and fluid is caused to flow through one set of passages for the purpose of delivering heat to, or abstracting heat from, fluid contained or flowing through another set of passages. Such a heat interchanger is disclosed in my prior application filed August 7, 1922, Serial No. 580,073.

This present invention is one embodiment of such a heat interchanger, the purpose of which is to enable units to be built up of solid material, rapidly and economically in any desired dimensions and with any desired capacity for interchange of heat. Fundamentally the invention which I here claim consists in a heat interchanger built up of bars or blocks formed with passages through or between them, and laid up and secured together in a unit structure in such a manner that the passages in the several bars register with one another to form continuous passages of the desired length. It includes also the unit above defined, together with certain additional features hereinafter described. Still further it includes a novel method of making heat interchangers of the character indicated.

In the drawings forming a part of this specification,—

Like reference characters designate the same parts wherever they occur in all the figures.

For convenience of description I will generally refer to the device which forms the subject of this invention as a heating element or heating unit, intending to include within the scope of that term any device having the characteristics of this invention, whether it is used for the purpose of heating a fluid or cooling a fluid by heat transfer from or to another fluid. The term "fluid" is used in this specification with generic meaning, to include gases, vapors, liquids and semi-liquids.

Figure 1:
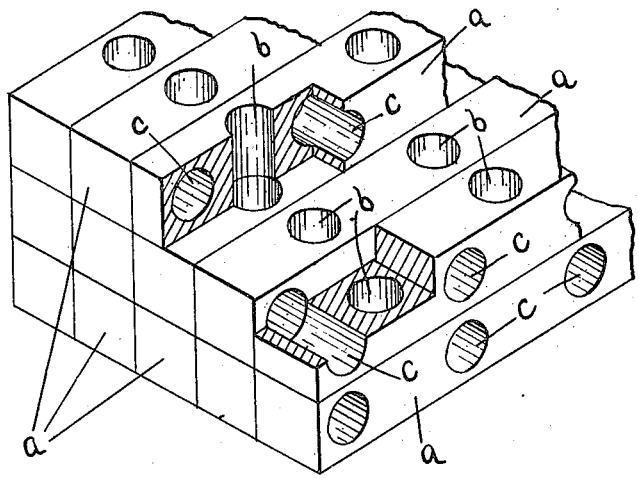
Figure 1 is a fragmentary perspective view showing one form of heat interchanger or heating element made according to this invention.

In constructing a heating unit according to Figure 1 of the drawings, I take solid bars $a$ of suitable material, such as cast iron, steel, brass or other metal having sufficient heat conductivity for the purpose in view; or I may even use such non-metals as have sufficient heat-conducting capacity. Where the unit is designed to effect heat transfer between two fluids only, the bars used are preferably rectangular in section. These bars are drilled (or they may be cast) with a series of holes $b$ extending in one transverse dimension, and with another series of holes $c$ extending in the other transverse dimension, the holes of one series being arranged in alternation with those of the other series. The bars may be of any transverse dimensions, and the different transverse dimensions of each bar may be equal or unequal, according to the uses for which a particular unit may be designed. Also the passages $b$ and $c$ may be of any diameter, and arranged with any desired spacing within the limits imposed by the dimensions of the bars and the necessity of leaving unbroken material between the passages of different series.

The bars so formed and pierced are cut off to the length of one of the dimensions of the heater, and are laid side by side with the holes of one series registering in all of the bars until the width of the course of bars so laid is equal to a second predetermined dimension of the unit. Finally other courses of bars are laid on top of the first course and upon one another, with all of the holes in the second series registering with one another until the third predetermined dimension of the unit is obtained.

The bars so assembled may be secured together in a rigid and practically integral structure by various means. One such means comprises bolts passing through alined holes, in adjacent bars and courses of bars. The holes through which said securing bolts pass may be the end ones, or any other, of the holes $b$ and $c$, or they may be special bolt holes of different dimensions than the holes $b$ and $c$. When the unit is to be held together in this way, the bars may be first laid up with a plastic packing compound or with sheet packing material between them in order to prevent leakage from the fluid passages at the joints between adjacent bars. But if the bars are rolled, or machined, or ground so that their surfaces fit together accurately, such packing material or compound may not be necessary.

Another mode of uniting the members of the unit together is to heat the entire assemblage of bars to a brazing or welding heat and apply such pressure as will unite the bars into a solid mass by welds or brazed joints.

Still another mode of securing them together will be presently described in connection with Figure 3.

Figure 2:
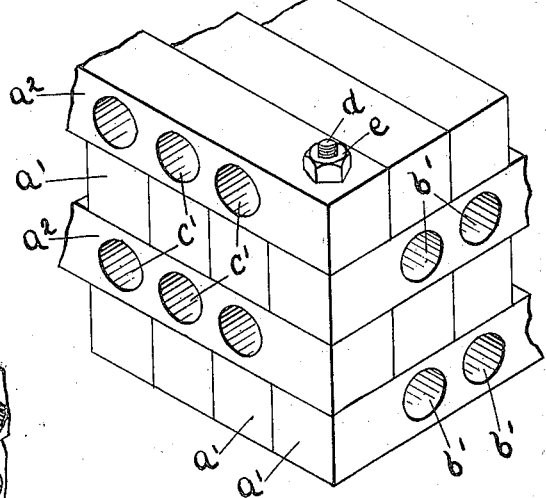
Figure 2 is a similar view showing a second form of such a heat interchanger.

The form of unit shown in Figure 2 is essentially like that just described, but differs specifically in that one series of holes only is formed in each bar. That is, all the holes in any one bar are parallel. The bars so pierced are laid in courses, with the holes of adjacent bars in alinement with one another, and the successive courses are so laid that the bars of each course are transverse to those of the contiguous upper and lower courses. Then the holes in the courses of bars $a'$ form a series of passages $b'$, while those in the intermediate courses $a^2$ form a second series of passages $c'$ transverse to the passages $b'$. The length of the bars in the courses $a'$ conforms to one of the dimensions of the unit, that of the bars in the courses $a^2$ conforms to a second dimension of the unit, and the number of courses determines the third dimension of the unit.

Figure 2 shows also one of the bolts $d$ by which the members of the unit are held together, and a nut $e$ threaded upon such bolt. This bolt passes through the bars of both sets of courses at one of the corners of the unit. Similar bolts may be placed at the other corners, and still other bolts may be passed through the passages, or other holes provided for their reception in other locations. Or, if desired, the bar is laid up as last described may be cemented, welded, or brazed together.

Figure 3:
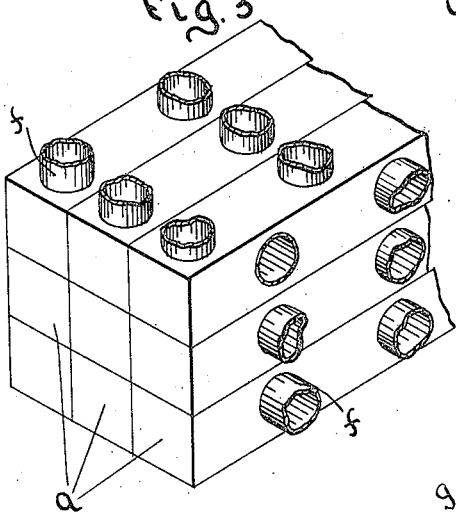
Figure 3 is a similar view showing a third form or embodiment of the present invention.

A third method of securing the bars together, when laid up as in Figure 1 or in Figure 2, or in any other way such that their passages are alined, is shown in Figure 3. This consists in inserting tubes $f$ in the passages, either in all of the passages or in a greater or less proportion of them. The ends of the tubes, where they protrude from the unit, may be beaded over the outer surfaces of the bars in a manner similar to that in which boiler and condenser tubes are beaded over the crown sheets in which they are set; and the tubes may be expanded througout their length into close contact with the walls of the passages. Or, if desired, the ends of the tubes may be welded or brazed in the outer bars of the unit. These inserted tubes not only serve as binding members for the sections of the unit, but they also preclude the possibility of leakage between the bars and dispense with need of any packing in the joints. A unit thus constructed is especially suited for very high pressures and temperatures, and even exceedingly thin walled tubes may be used because they are externally firmly supported, and the spaces between the bars are not wide enough to permit rupture there of such tubes. This is the case even though the bars are not fitted so as to make especially close joints with one another.

In case the bars are cast and the holes in them are formed by cores, such tubes may serve the further purpose of providing smooth linings for the passages, the walls of which may be rough. In such cases a molten metal or plastic composition may be run or forced into the crevices between the inserted tubes and the walls of the passages.

The inserted tubes may be made readily removable by being formed with a weakened longitudinal section capable of being grasped by, or fastened to, an instrument passing through the hole and then torn out. Then the remainder of the tube may be readily collapsed and removed. This method also permits a lead tube, or one made of any other non-corrodible material, to be used as a lining for the passages in cases where the nature of the fluid used requires the passages, or some of them, to be thus lined. Also a lead tube is another example of an easily removable lining.

Figure 4:
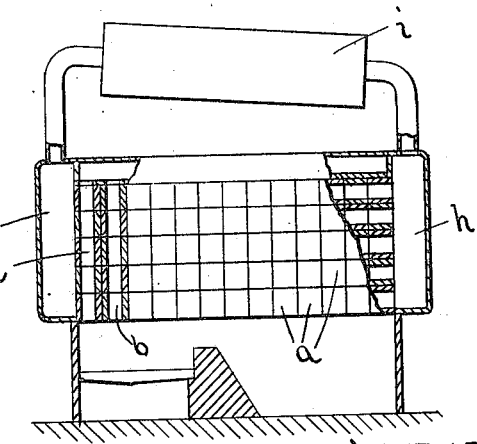
Figure 4 is a diagrammatic view, partly in section and partly in elevation, showing a heat interchanger of this character combined with accessory devices and applied to the uses of a steam boiler.

Such a heating unit may be applied to any uses in which interchange of heat between fluids is required. In Figure 4 I have shown illustratively its application to the uses of a steam boiler, in which it is arranged with one series of passages running in the vertical direction, or nearly so, to receive the products of combustion from the fire, and the other set of passages running horizontally, or nearly so, to conduct water. The chambers $g$ and $h$ here shown are water chambers suitably fastened to the ends of the unit in communication with the water passages, and connected with a steam drum $i$.

Heating units embodying the same principles but formed of bars or members having specifically different shapes than those here illustrated may be used. For example, instead of using bars of square or oblong section, I may use hexagonal bars having three sets of transverse passages, each extending respectively through one of the three pairs of opposite sides of the bars, and the individual passages of the three sets being interspersed between one another in rotation.

Figure 5:
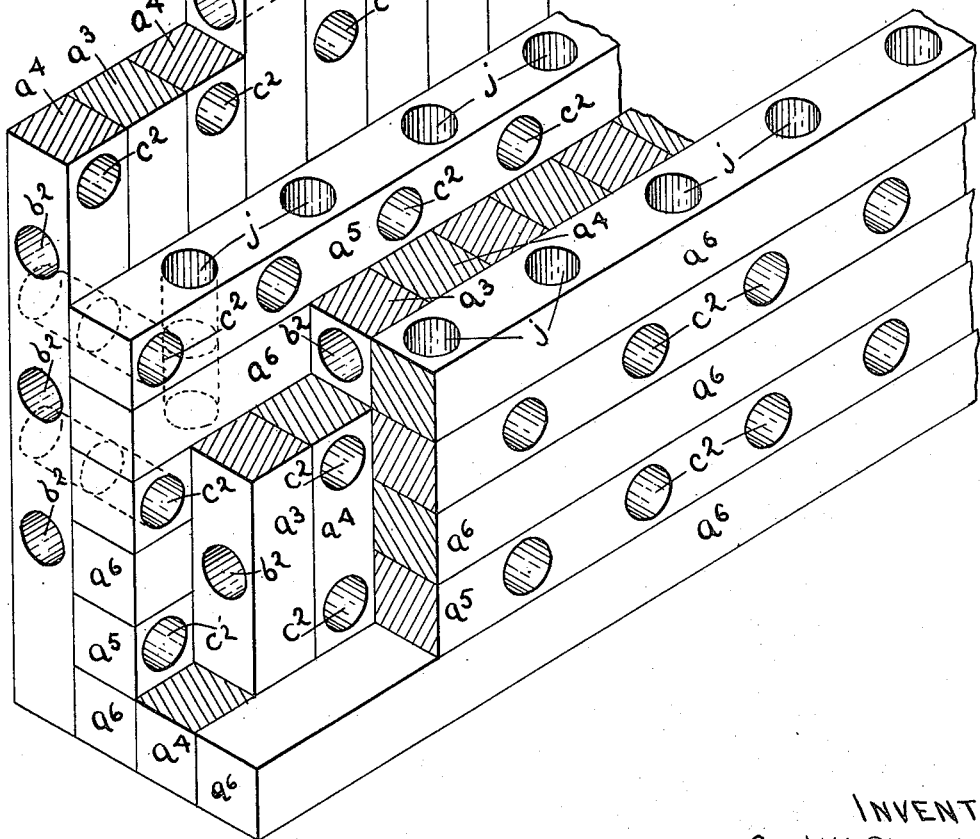
Figure 5 is a fragmentary perspective view of a heater made according to this invention and having passages running in three directions.

An extension of the same principles to provide a heating unit having passages extending in each of three different directions, corresponding generally to the three dimensions of a solid, is shown in Figure 5. Here the bars are arranged substantially as in Figure 2, that is, with the bars of alternate courses transverse to those of the intermediate and adjacent courses, but in each course alternate bars have holes through one transverse dimension, only, while the intermediate and adjacent bars of the same course have holes through both transverse dimensions. As represented in this drawing the bars $a^3$ and $a^4$, laid side by side in alternation, form alternate courses, and the bars $a^5$ and $a^6$, likewise laid side by side in alternation, form the intermediate courses and are transverse to the bars $a^3$ and $a^4$.

In each of the bars $a^3$ are formed holes $b^2$ extending through one transverse dimension only; in each of the bars $a^4$ are holes $b^2$ and $c^2$ extending in the directions of two transverse dimensions; in the bars $a^5$ are holes $c^2$ and $j$ extending in the directions of two transverse dimensions; and in the bars $a^6$ are holes $j$ extending through only one transverse dimension of these bars. When the bars are assembled to make a complete unit, they are laid so that the holes $b^2$ in all the bars $a^3$ and $a^4$ of each course containing bars so designated are alined to form continuous parallel passages; the holes $j$ of all the bars $a^5$ and $a^6$ in each course which contains the last-named bars are alined to form continuous parallel passages transverse to the passages $b^2$; and the adjacent courses are so placed that the holes $c^2$ in the bars $a^4$ and $a^5$ form parallel alined passages transverse to both the passages $b^2$ and $j$. In each bar ($a^4$, $a^5$) which has two sets of holes, the holes of each set are spaced so as to alternate with those of the other set; and in each course, the bars ($a^3$, $a^6$) which have only one set of holes are beside and extend parallel to the line of an alined series of holes in the adjacent courses. That is, specifically the bars $a^3$ are beside and parallel to the passages formed by the alined holes $j$, and the bars $a^6$ are beside and parallel to the passages formed by the alined holes $b^2$. Each line of holes, then, forms a continuous unbroken passage, distinct from all the other passages. Thus there are provided in the whole unit three sets of passages running respectively in each of three different directions, and of which the holes of each set are parallel to one another and transverse to and arranged between those of each of the other sets.

The bars may have any dimensions consistent with the size of the entire unit and with the dimensions and members required for the passages of the several sets. They also may be either rectangular or oblique angled in cross section, provided they are properly formed to fit together in the manner necessary to provide passages of the character described. When assembled into a heater unit, the bars may be secured together, and combined with auxiliary fittings for the conduction of fluids to and away from the several sets of passages, in any of the ways and by any of the means hereinbefore described or indicated in connection with the two-way units.

Figure 6:
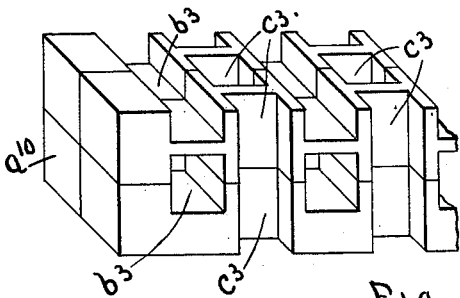
Figure 6 is a similar view of a heater constructed of bars having open notches or grooves in place of enclosed holes.
Figure 6:
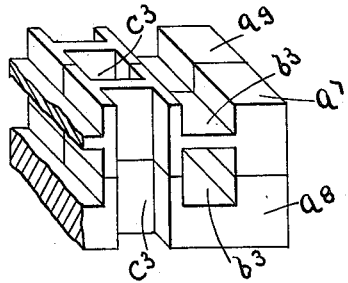
Figure 7:
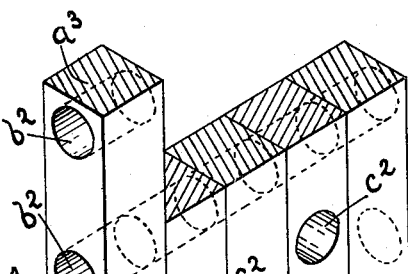
Figure 7 is a perspective view of a modified form of bar from which the device may be constructed.

Instead of forming the passages as holes cut, forged, or cast through the bars, they may be made as open notches, slots or grooves in the sides of the bars, as shown in Figure 6. Bars such as those designated $a^7$ may be provided to make the major part of the unit, that is, all except the outermost courses. Such bars have external slots $b^3$, $b^3$ and $c^3$, $c^3$ of rectangular or curved outline, which, when matched together with other bars, form continuous passages extending in each of two different directions, and having the same relationship to one another as the passages $b$ $c$, $b'$ $c'$, and $b^2$ $c^2$, previously. The particular bar now being described has such slots in each of its opposite sides, but equivalent bars may be made in which each slot or notch $b^3$ is formed in one side only, and each slot or notch $c^3$ is likewise formed in one other side only; the notches being closed on the open side by the continuous surface of an adjacent bar. Indeed a bar of the character last indicated is shown at $a^{10}$ and in detail in Fig. 7 to form the corner members of the unit and close the outer sides of the outermost rows of passages. The intermediate bars of the outer courses are formed to close the outer sides of the passages of one set only, instead of both sets.

Those portions of the last-named bars which enclose the outer passages provide surfaces against which may be abutted the rims of the external fittings, previously mentioned, which form chambers connecting the ends of the passages with pipes or conduits in the manner disclosed in my prior application Serial No. 580,073. The bars of these last described forms may also be secured together or united in any of the ways previously indicated and their passages may be lined.

The constructions in which the passages are formed by assemblage of bars having open notches are equivalent to those in which the passages are formed by alined entirely closed holes. For the purposes of this specification I have adopted the word "duct" as a generic term to signify the holes or slots herein disclosed, or any other equivalent formation which, in bars or their equivalents, assembled as described, will form passages adapted to contain and conduct two or more fluids at different temperatures in heat-transferring relationship to one another, substantially as here described.

A characteristic of either form of heater, constructed in any of the ways above described, is that the individual bars are so formed as to match together, and the transverse holes or slots in them are so arranged that those of adjacent bars may be alined to form continuous passages between the bars thus matched together. Such a method of construction lends itself readily to building heating units in a wide range of sizes and dimensions from bars or blocks of uniform cross sectional dimensions or of a few standard sizes. Such bars, of course, may be cut to any desired length, and may then be assembled in sufficient numbers to make a unit of any desired dimensions. The units so made have all the advantages due to great heating surface compressed into compact outside dimensions and the capacity for rapid heat transfer due to solid metal between the passages in which the fluids of different temperatures are respectively confined and to the subdivision of the fluids into narrow streams flowing at high velocity in contact with the metal.

When assembled the bars form virtually a solid mass, and they form actually a homogeneous mass in the case where they are welded or brazed together. In addition to these advantages, the method of construction is of the most economical character, and it involves the minimum investment of capital for material required to be kept in stock to manufacture units of a wide range of capacities, and a wide variation of dimensions.

The bars at the ends or corners of the unit may be extended far enough beyond the outermost passages to provide material into or through which fastening means may be passed to attach external fittings to the unit in a manner more or less similar to that shown in my prior application aforesaid, in which solid material is formed in substantial masses at the ends of the unit for these purposes; or the outermost holes may be used for the reception of such fastening means, or may be omitted and bolt-receiving passages of different dimensions substituted for them.

What I claim and desire to secure by Letters Patent is:

1. A heat interchanger comprising solid bars formed to match together side by side, said bars each having transverse ducts at intervals, alternate ducts extending in different directions, and said bars being laid in contact with one another in such relations that their ducts are alined to form enclosed fluid-conducting passages.

2. A heat interchanger comprising a plurality of similar prismatic bars arranged with their external surfaces contacting with one another in unit block assemblages and having alined ducts in them, forming passages, said bars being solid except for the ducts and providing continuous heat-conducting metal between the ducts, and tubes fitting said passages and extending across the joints between adjacent members.

3. A heat interchanger comprising a plurality of similar prismatic bars arranged with surfaces contacting with one another and a plurality of ducts in them, forming the corresponding ducts being alined and passages, and tubes fitting said passages and extending across the joints between adjacent members, said tubes being secured in said passages.

4. A heat interchanger comprising a plurality of similar members arranged with surfaces contacting with one another and having alined ducts in them, forming passages, and tubes fitting said passages and extending across the joints between adjacent members, said tubes being secured in said passages but being of tearable material, whereby they may be torn and removed from the passages.

5. A heat interchanger unit consisting of prismatic bars, provided with ducts at intervals extending alternately in two directions in the transverse dimensions of said bars, said bars being arranged side by side and in courses with corresponding ducts of adjacent bars in alinement.

6. A heat interchanger unit consisting of prismatic bars, formed with ducts at intervals extending alternately in two directions in the transverse dimensions of said bars, said bars being arranged side by side and in courses with corresponding ducts of adjacent bars in alinement, and tubes in the passages formed by the several alined ducts.

In testimony whereof I have affixed my signature.

CECIL W. STANCLIFFE.